United States Patent
Kerestes et al.

(10) Patent No.: US 11,185,949 B2
(45) Date of Patent: Nov. 30, 2021

(54) METHOD OF MANUFACTURING STRUCTURAL COMPONENT FOR JOINING WITH ANOTHER STRUCTURAL COMPONENT BY STRESS PROTECTED GROOVE WELD

(71) Applicant: Caterpillar Inc., Deerfield, IL (US)

(72) Inventors: Chad William Kerestes, Oglesby, IL (US); William Jay Ulrich, IV, East Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 447 days.

(21) Appl. No.: 16/352,987

(22) Filed: Mar. 14, 2019

(65) Prior Publication Data
US 2020/0290159 A1 Sep. 17, 2020

(51) Int. Cl.
*B23K 33/00* (2006.01)

(52) U.S. Cl.
CPC .................. *B23K 33/002* (2013.01)

(58) Field of Classification Search
CPC ..... B23K 33/00; B23K 33/002; B23K 33/004
See application file for complete search history.

(56) References Cited

U.S. PATENT DOCUMENTS

| | | | | |
|---|---|---|---|---|
| 1,496,936 A | * | 6/1924 | Lowe | B23K 33/004 219/137 R |
| 1,790,738 A | * | 2/1931 | Andren | B23K 33/004 219/137 R |
| 2,288,433 A | * | 6/1942 | Boetcher | B23K 33/004 219/137 R |
| 2,415,987 A | * | 2/1947 | Bissout | B23K 33/004 219/101 |
| 2,453,061 A | * | 11/1948 | Bissout | B23K 11/04 219/137 R |
| 2,945,942 A | * | 7/1960 | Flynn | B23K 33/00 219/137 R |
| 6,386,427 B2 | * | 5/2002 | Iwago | B23K 9/235 228/164 |

(Continued)

FOREIGN PATENT DOCUMENTS

| | | | |
|---|---|---|---|
| CN | 105234577 A | * 1/2016 | |
| EP | 0665079 A1 | * 8/1995 | ........... B23K 9/0213 |

(Continued)

*Primary Examiner* — Erin B Saad
*Assistant Examiner* — Carlos J Gamino

(57) ABSTRACT

Method of manufacturing first structural component for or joining with second structural component by groove weld is provided. The first structural component has first surface, second surface and end portion. The component is bent at end portion to form bent portion defining convex and concave faces. First portion of bent portion is removed at convex face in form outer weld surface having first face extending from first surface, and second face connected to first face. Second portion of bent portion is removed at concave face to form inner edge surface having arcuate profile. Inner edge surface extends from second surface and connects to second face via transition portion. A portion of first face, second face, transition portion, and inner edge surface define root protrusion, having a root protrusion height, for first structural component. The root protrusion defines stress protected weld root region isolated beyond and away from root stress flow path.

10 Claims, 8 Drawing Sheets

(56) References Cited

U.S. PATENT DOCUMENTS

| | | | |
|---|---|---|---|
| 7,374,823 B2 | 5/2008 | Maruyama et al. | |
| 10,688,600 B2 * | 6/2020 | Griffith | B23K 31/003 |
| 2004/0169062 A1 * | 9/2004 | Maruyama | B23K 9/0356 |
| | | | 228/173.1 |
| 2018/0161941 A1 | 6/2018 | Griffith et al. | |
| 2018/0304413 A1 | 10/2018 | Griffith | |

FOREIGN PATENT DOCUMENTS

| | | | | |
|---|---|---|---|---|
| GB | 656696 A | * | 8/1951 | B23K 33/004 |
| JP | 58151968 A | * | 9/1983 | B23K 33/004 |

* cited by examiner

METHOD OF MANUFACTURING STRUCTURAL COMPONENT FOR JOINING WITH ANOTHER STRUCTURAL COMPONENT BY STRESS PROTECTED GROOVE WELD

TECHNICAL FIELD

The present disclosure generally relates to stress protected groove welds, and more particularly, relates to a method of manufacturing a structural component to be joined with another structural component by stress protected groove welds.

BACKGROUND

Groove welds are known to be used to join structural components to form one or more weldments of a wide variety of numerous different types of structures. In particular, a groove weld may be a means by which two structural components or other metal components are joined together by the affixation of adjacent and/or mating edges or surfaces as a result of a mutual thermal bonding transformation therebetween which may be provided, at least in part, by heated filler material. At least a part of the interior of the groove weld may be composed of the filler material which may engage and thermally bond with the adjacent surfaces and edges of the pre-existing parent material of the structural components or other metal components, including at a bottom, or "root" portion of the groove weld and the structural components.

While groove welds may be widely used as an effective means by Which structural components are joined to form a wide variety of numerous different types of structures, typical, conventional groove welds may be subsequently susceptible to fatigue or failure. For example, the welded structure may be subject to cyclic loading, forces and/or stresses, which may include, in part, tensile or bending forces that produce stresses on the weld and structural components. When loading, forces, and/or stresses are applied to the structure and the groove weld, portions of the groove weld, may be incapable of absorbing and withstanding loading, forces, and/or stresses applied thereto, and thus may be particularly susceptible to fatigue or failure.

U.S. Pat. No. 7,374,823 (hereinafter referred to as the '823 patent) provides a weld assembly including first and second members having inclined portions that are joined by a weld bead. However, the failure of groove weld joints continues to he problematic in the field because the weld root and/or the weld toe remains subject to high stresses.

SUMMARY OF THE INVENTION

In an aspect of the present disclosure, a method of manufacturing first structural component for joining with second structural component by groove weld is provided. The first structural component includes a body having a first surface, a second surface and an end portion. The method includes bending the first structural component at the end portion to form a bent portion defining a convex and a concave face. The first portion of the bent portion is removed at the convex face to form an outer weld surface having a first face extending from the first surface, and a second face connected to the first face. Further, the second portion of bent portion is removed at the concave face to form an inner edge surface having an arcuate profile. The inner edge surface extends from the second surface and connects to the second face via a transition portion. A portion of the first face. the second face, the transition portion, and the inner edge surface define a root protrusion, having a root protrusion height, for the first structural component. The root protrusion defines a stress protected weld root region isolated beyond and away from root stress flow path that propagates through the first structural component.

DETAILED DESCRIPTION

Reference will now be made in detail to specific embodiments or features, examples of which are illustrated in the accompanying drawings. Generally, corresponding reference numbers will be used throughout the drawings to refer to the same or corresponding parts.

Figure 1:
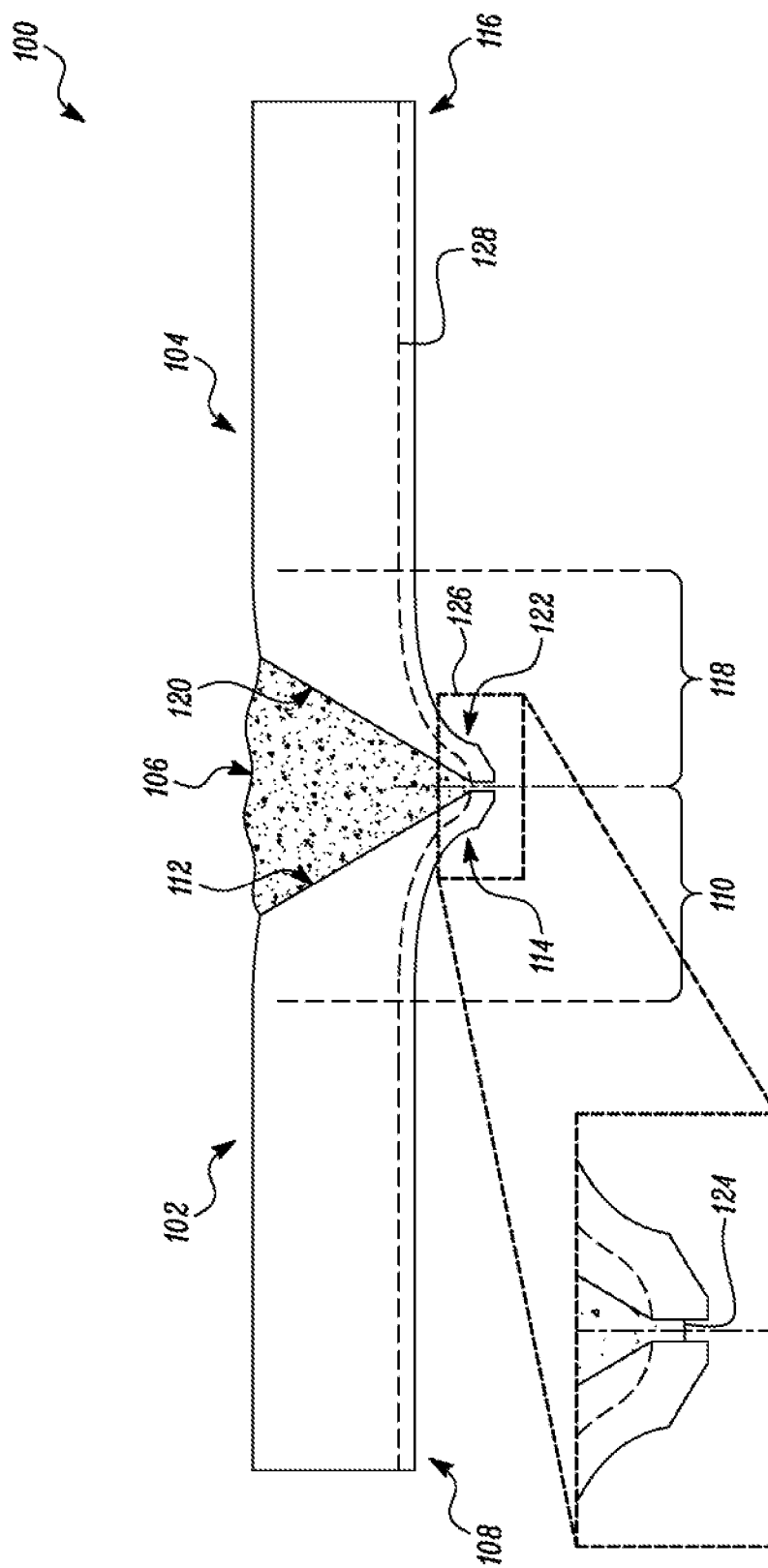
FIG. 1 illustrates an exemplary structure including a first structural component and a second structural component joined together by a groove weld, in accordance with an embodiment of the present disclosure.

The present disclosure relates to a structure having two or more structural components joined by groove welds according to the embodiments of the present disclosure. FIG. 1 illustrates an exemplary structure 100 including a first structural component 102 and a second structural component 104 joined by a groove weld 106 to form a weldment and the resultant structure 100. Although the illustrated embodiments show two structural components, it may be contemplated that the structure 100 may include any number of structural components which may be joined by numerous groove welds, without deviating from the scope of the claimed subject matter.

Each of the first structural component 102 and the second structural component 104 may be composed of a metal, including but not limited to iron, steel, aluminum, or any other metal, or any alloys thereof, capable of being joined via a groove weld, such as the groove weld 106 of the present disclosure. For the purposes of the present disclosure, the term "welding" (or "weld"), includes any process or result thereof wherein two structural components or metal components are joined together by affixation of adjacent and/or mating edges or surfaces as a result of a mutual thermal frictional, or any other type of bonding transformation therebetween.

The groove weld 106 may include, but not limited to, shielded metal arc welding, gas tungsten arc welding, or tungsten inert gas welding, gas metal arc welding or metal inert gas welding, flux-cored arc welding, submerged arc welding, electroslag welding, and the like. The groove weld 106 may also include cladding, brazing, soldering, friction stir welding, laser welding, and hybrid laser arc welding.

Further, each of the first structural component 102 and the second structural component 104 may be formed to embody any of variety of shapes, contours, profiles, bodies, structures or any combination or combinations thereof, as necessary to form a suitable or desired structure, such as the structure 100 of the present disclosure. In the illustrated embodiment, the first structural component 102 and the second structural component 104 may be planar to define a plate. Alternatively, the first structural component 102 and the second structural component 104 may include one or more of planar, arcuate, cylindrical, concave, convex, and/or incurvate shape, to form a contoured structure of the structural components 102, 104 in a yet another non-limiting example, the structural components 102, 104 may be tubular or cylindrical or curved to form a cylindrical tube or a non-cylindrical tube.

In an embodiment of the present disclosure, the first structural component 102 includes a first end 108, and a weld end 110 having a first outer weld surface 112 and a first root protrusion 114. Similarly, the second structural component 104 includes a respective first end 116 and a weld end 118 having a second outer weld surface 120 and a second root protrusion 122. The weld ends 110, 118, the outer weld surfaces 112, 120 and the root protrusions 114, 122 are included at each of any one or more outer edges, sides, extensions, or boundaries of the first structural component 102 and the second structural component 104, which are configured to be joined via the groove weld 106 to an adjacent, corresponding, opposing weld ends 110, 118, the outer weld surfaces 112, 120 and the root protrusions 114, 122 of an opposing, second structural component 104 and first structural component 102 (or any other structural component, including, in part, any root protrusion according to the present disclosure) to form the structure 100.

In an embodiment of the present disclosure, the root protrusions 114. 122 are configured to locate a weld root 124 of the groove weld 106 within a stress protected weld root region 126. The stress protected weld mot region 126 corresponds to a negligible stress concentration zone isolated beyond and away from a root stress flow path 128 propagated through the structural components 102, 104 of the structure 100, such that fatigue failure does not occur in the weld root 124 and the stress protected weld root region 126.

In an embodiment of the present disclosure, each of the first structural component 102 and the second structural component 104 are identical to each other. However, it may he contemplated that in various alternative embodiments, the structural components 102, 104 may have different profiles, shapes and dimensions than one another, without deviating from the scope of the claimed subject matter.

Referring to FIGS. 2 to 7, an exemplary first structural component 102' is provided along with a method 300 for manufacturing the first structural component 102 having the profile as shown FIG. 1.

Figure 2:
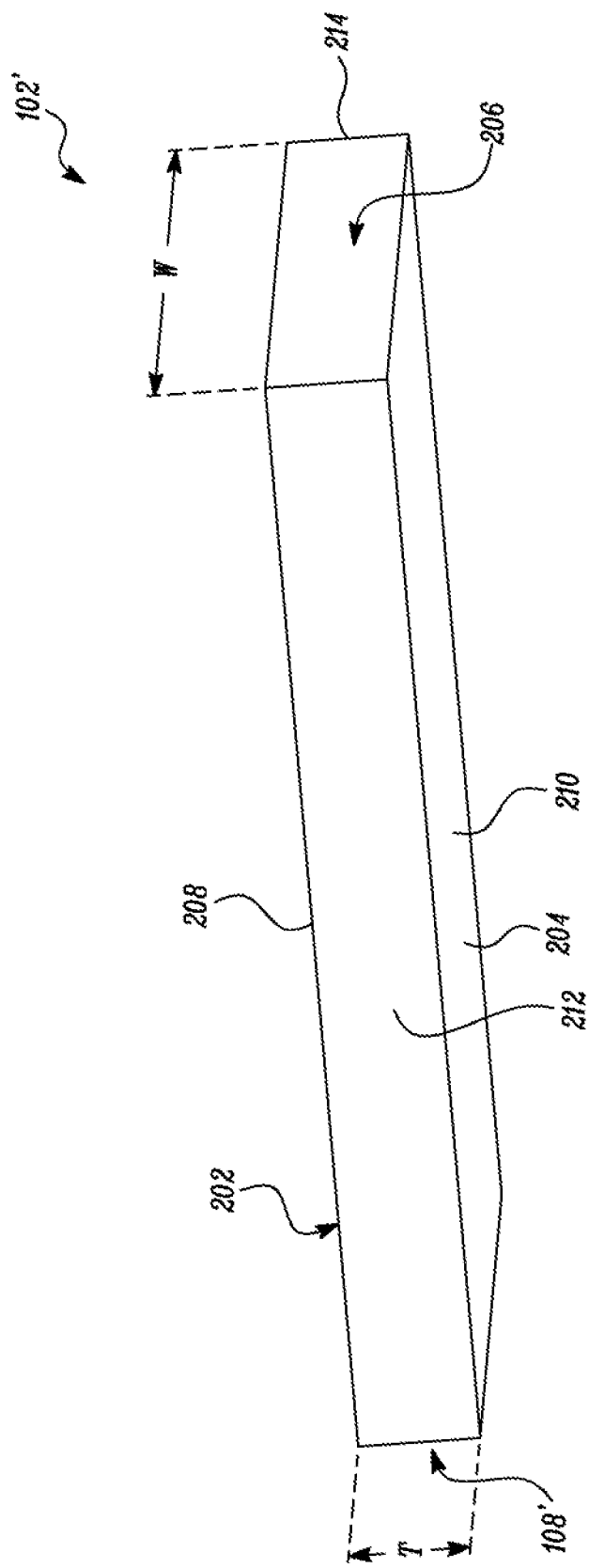
FIGS. 2 to 7 illustrate an exemplary method of manufacturing the first structural component for joining with the second structural component by the groove weld, in accordance with the embodiment of the present disclosure.
Figure 3:
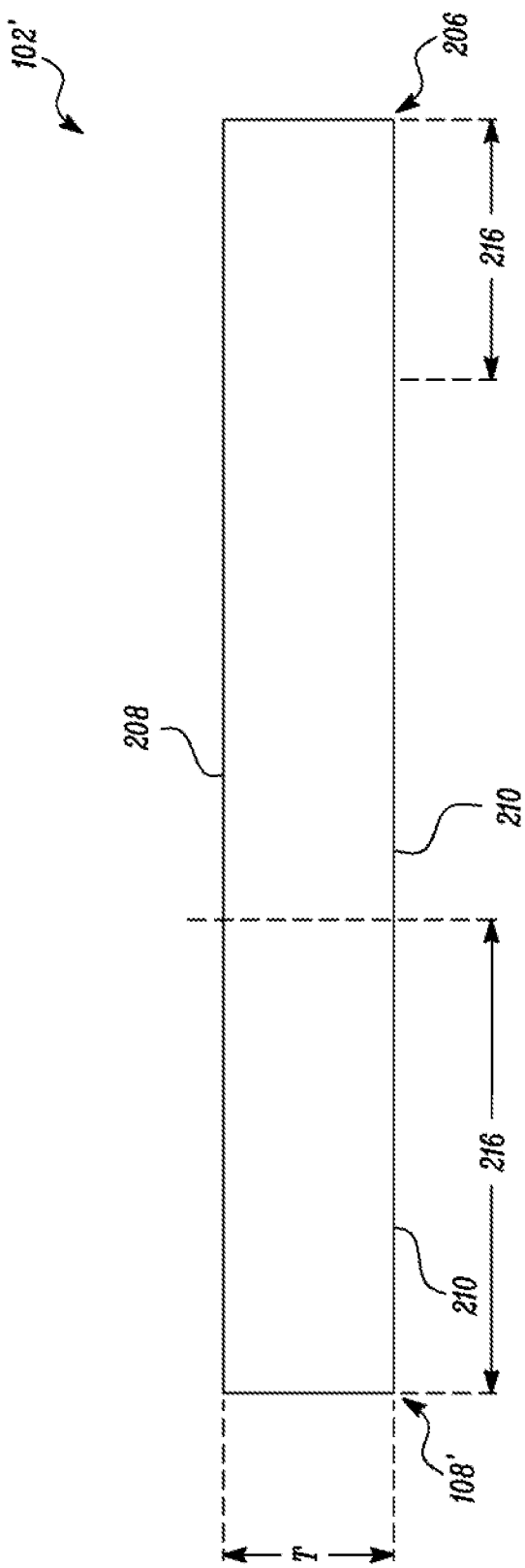

FIGS. 2 and 3 illustrate an exemplary first structural component 102', hereinafter interchangeably referred to as the component 102', in the form of a plate 202. The component 102' includes a body 204 defining the first end 108' and a second end 206. The body 204 further includes a first surface 208, a second surface 210, a first side surface 212, and a second side surface 214. The component 102' further includes a first end portion 216 defined proximal to the first end 108' and a second end portion 218 defined proximal to the second end 206 (as shown in FIG. 3). The first surface 208 and the second surface 210 define a thickness T of the component 102', whereas the first side surface 212 and the second side surface 214 define a width W of the component 102'. The first surface 208 may define an outer or upper surface of the component 102', whereas the second surface 210 may define an inner or lower surface of the component 102'. Alternatively, the first surface 208 may define the inner or lower surface of the component 102', and the second surface 210 may define the outer or upper surface of the component 102' depending upon the type, use, application, constraints, or other considerations attendant to the structure 100, including but not limited to the formation thereof. As such, although the relative terms "above", "outer", "upper", "raised", "below", "lower", "lowered", or "inner" may be used, such terms are used exclusively for the purposes of identifying and disclosing the various features of the disclosure herein with respect to and relative to the orientation of the illustrated Figures, but should not be construed as limiting the scope of the disclosure as excluding orientations which may differ from the illustrated. Figures, but in all other respects are equivalent.

In the illustrated embodiment of the present disclosure, the first surface 208 is parallel to the second surface 210, and the first side surface 212 is parallel to the second side surface 214, thereby defining a cuboidal structure of the component 102'. It may further be contemplated that the shape and dimensions of the component 102' are merely exemplary and may be varied to achieve similar results without deviating from the scope of the claimed subject matter.

Figure 4:
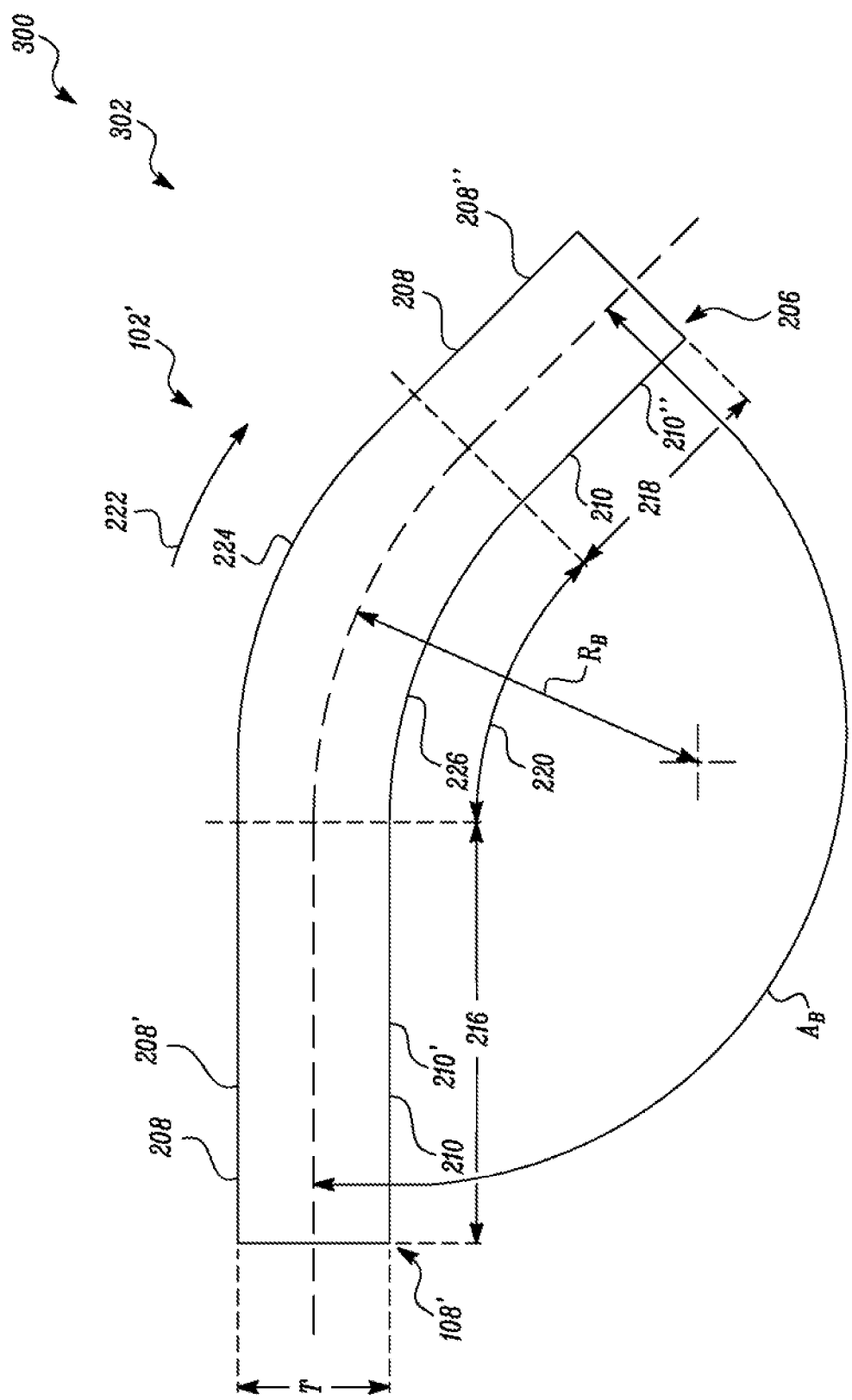

Referring to FIGS. 4 to 7, an exemplary method 300 of manufacturing the first structural component 102, from the first structural component 102', for joining with the second structural component 104 to form the resultant structure 100, is disclosed. In an embodiment, as shown in FIG. 4, initially at step 302, the first structural component 102' is bent at the second end portion 218 with respect to the first end portion 216, to form a bent portion 220 therebetween. For example, the component 102' is bent in the component's rolling direction, as shown by the arrow 222. The component 102' may be bent using dies, fixtures, or any other conventionally known bending process. It may also be contemplated that the bending of the component 102' may be done manually or by using automated machines.

The bent portion 220 may define a bending radius $R_B$ that is directly proportional to the thickness T of the component 102'. In an embodiment of the present disclosure, the bending radius $R_B$ lies within a range of 1.5 times to 3.5 times the thickness T of the component 102'. In one non-limiting example, the bent portion 220 includes a bending radius $R_B$ of 1.5 times the thickness T of the component 102', when the thickness T lies within 10 millimeters to 30 millimeters. In another non-limiting example, the bent portion 220 includes a bending radius $R_B$ of 3 times the thickness T of the component 102', when the thickness T lies within 30 millimeters to 50 millimeters. In a yet another non-limiting example, the bent portion 220 includes a bending radius $R_B$ of 3.5 times the thickness T of the component 102', when the thickness T is greater than 50 millimeters. Further, as shown in FIG. 4, the component 102' is bent at a bend angle $A_B$, that is formed between the first end portion 216 and the second end portion 218. The bend angle $A_B$ may be directly proportional to the thickness T of the component 102'. In an embodiment of the present disclosure, the bend angle $A_B$ lies within a range of 110 degrees to 135 degrees. In one example, the bend angle $A_B$ is 135 degrees.

The bent portion 220 defines a convex face 224 and a concave face 226. As illustrated, the convex face 224 extends between a portion 208' of the first surface 208 associated with the first end portion 216 and a portion 208" of the first surface 208 associated with the second end portion 218. Similarly, the concave tee 226 extends between a portion 210' of the second surface 210 associated with the first end portion 216 and a portion 210" of the second surface 210 associated with the second end portion 218.

Figure 5:
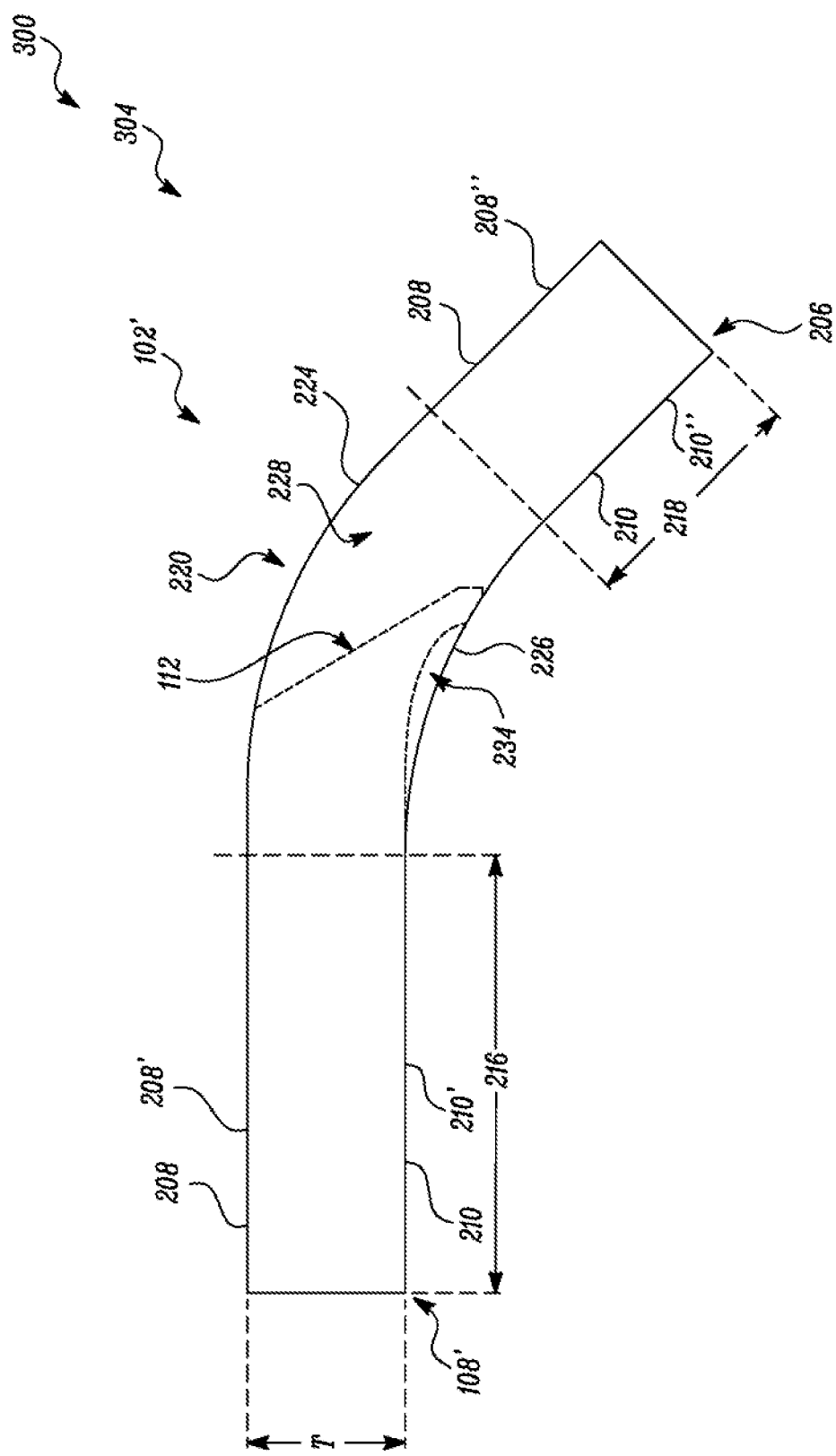
Figure 6:
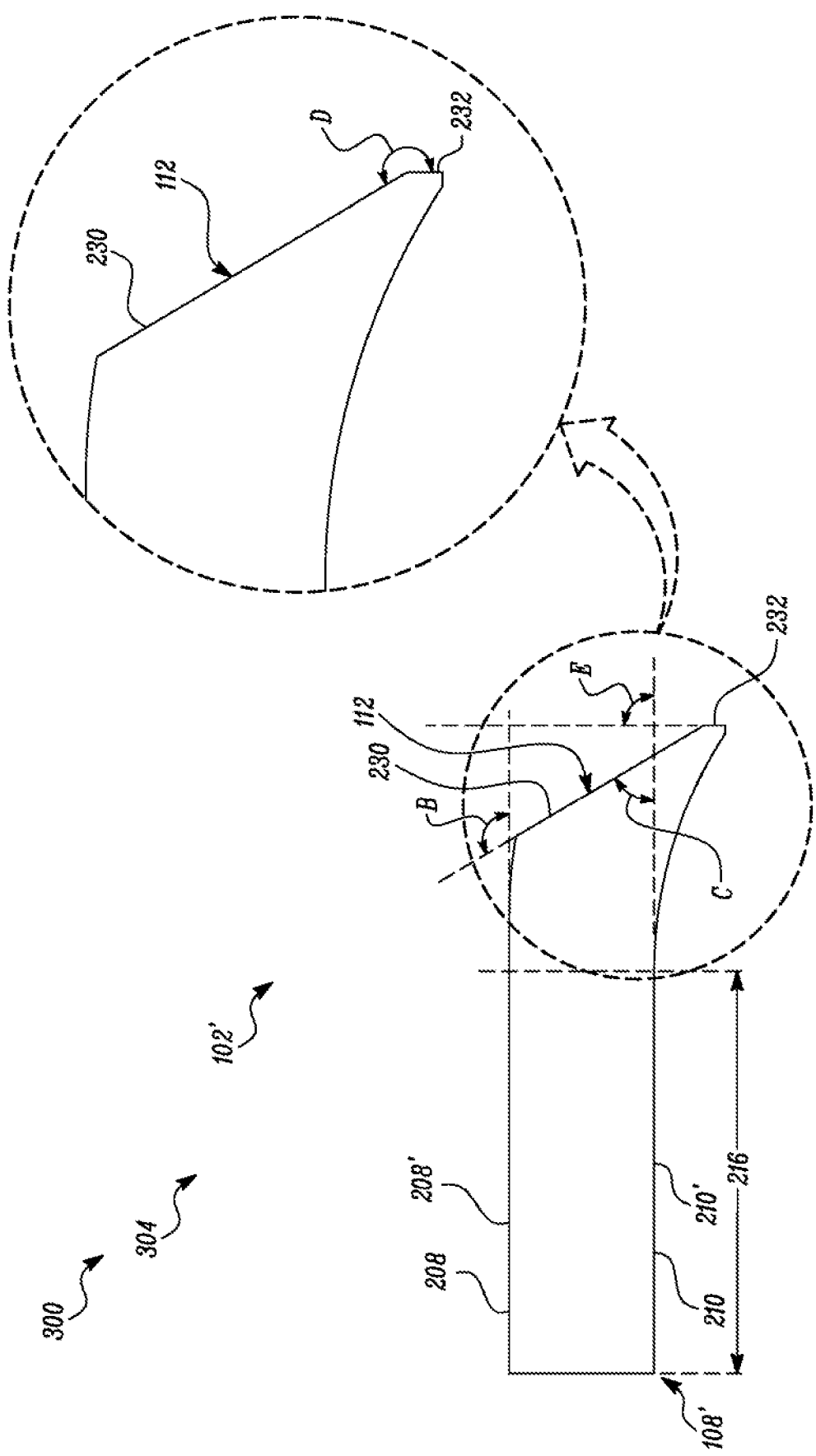

Subsequent to bending of the component 102' at step 302, the method 300 proceeds to step 304 shown in FIGS. 5 & 6. In an embodiment of the present. disclosure, at step 304, a first portion 228 of the bent portion 220 along with the second end portion 218 of the component 102', is removed from the component 102', to form the first outer weld surface 112 (as shown in FIG. 6). In various examples, removal of the first portion 228 and the second end portion 218 may be done using conventionally known machining methods, such as milling, laser cutting, etc. To this end, material of the component 102' may be removed across the width W, such that the first outer weld surface 112 extends across the width W of the component 102'. However, it may be contemplated that the material may be removed partially between the side surfaces 212, 214 so as to form partial outer weld surface(s) in certain applications. Although the first portion 228 and the second end portion 218 may be removed simultaneously, it may be noted that, in some embodiments, the second end portion 218 may be removed prior to the removal of the first portion 228.

In an embodiment, as shown in FIG. 6, the first outer weld surface 112 of the component 102' includes a first face 230 and a second face 232 connected to the first face 230 to define an excluded angle D therebetween. The magnitude of the excluded angle D may lie within a range of 190 degrees to 215 degrees. In one example, the magnitude of the excluded angle D is 210 degrees. Further, the first face 230 defines an angle B with the portion 208' of the first surface 208 associated with the first end portion 216 of the component 102'. In an example, a magnitude of the angle B may lie within a range of 110 degrees to 120 degrees. Furthermore, the first face 230 defines an angle C (e.g., an acute angle C) with the portion 210' of the second surface 210 associated with the first end portion 216 of the component 102'. In one example, a magnitude of the angle C lies within a range of 60 degrees to 70 degrees.

The second face 232 defines an angle E with the portion 210' of the second surface 210 associated with the first end portion 216 of the component 102', For example, a magnitude of the angle E lies within a range of 85 degrees to 95 degrees. In one example, the magnitude of the angle E is 90 degrees, i.e., the second face 232 is perpendicular to the portion 210' of the second surface 210 associated with the first end portion 216 of the component 102.

Figure 7:
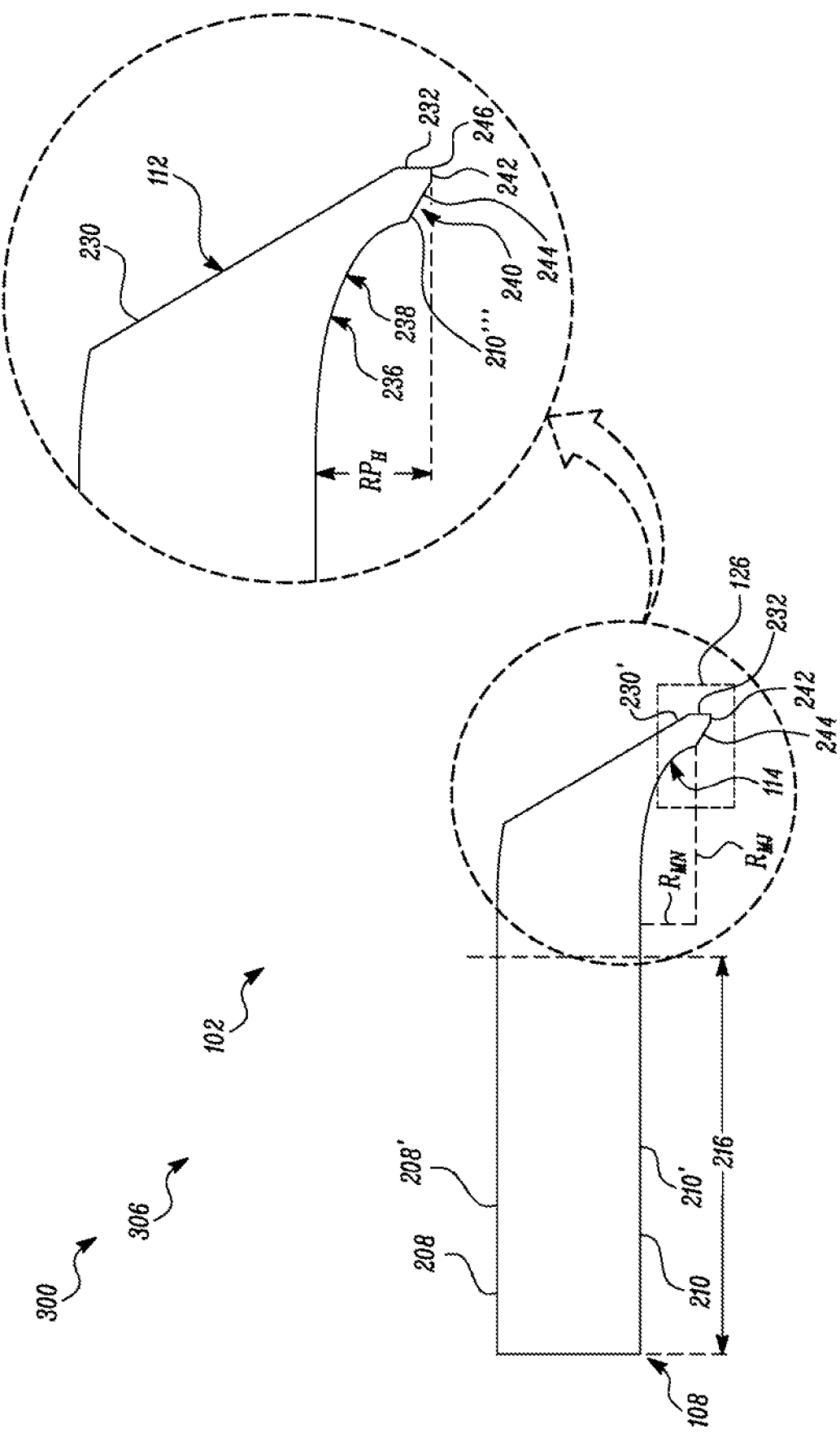

Subsequent to the removal of the first portion 228 and the second end portion 218 at step 304, the method 300 proceeds to step 306 as shown in FIG. 7. At step 306, a second portion 234 (as shown in FIG. 5) of the bent portion 220 at the concave face 226 is removed to form an inner edge surface 236 and accordingly obtain the profile of the first structural component 102 of FIG. 1. In various examples, similar to the removal of first portion 228 at step 304, the removal of the second portion 234 may also be done using conventionally known machining methods, such as milling, laser cutting, etc. Further, the material may be removed across the width W of the component 102', such that the inner edge surface 236 extends across the width W. However, it may be contemplated that the material may be removed partially between the side surfaces 212, 214 so as to form a partial inner edge surface(s) in certain applications. In some applications, step 304 and step 306 may be performed simultaneously.

As illustrated, the inner edge surface 236 includes an arcuate profile 238, and extends from the second surface 210 (or a portion 210' of the second surface 210) associated with the first end portion 216 and connects to the second face 232 of the first outer weld surface 112. In an embodiment of the present disclosure, the arcuate profile 238 is an elliptical profile having a major radius $R_{MJ}$ and a minor radius $R_{MN}$, such that the major radius $R_{MJ}$ is greater than the minor radius $R_{MN}$. In one example, the major radius $R_{MJ}$ is 2.5 times the minor radius $R_{MN}$. For example, the minor radius $R_{MN}$ is 8 millimeters, and the major radius $R_{MJ}$ is 2.5 times the minor radius $R_{MN}$, i.e., 20 millimeters. It may be contemplated that the magnitude and proportion of the major radius $R_{MJ}$ and the minor radius $R_{MN}$ with respect to each other are merely exemplary and may he varied to achieve similar results without deviating from the scope of the claimed subject matter. In an alternative embodiment of the present disclosure, the arcuate profile 238 may be a circular profile, where the major radius $R_{MJ}$ and the minor radius $R_{MN}$ are equal.

Furthermore, the inner edge surface 236 is connected to the second face 232 via a transition portion 240 including a first transition face 242 and a second transition face 244. In an embodiment, and although not limited, the first transition face 242 may be machined and removed during the removal of the first portion 228 at step 304 from thee body 204 of the component 102' (i.e., the first transition face 242 may be formed along with the formation of the first face 230 and the second face 232). The first transition face 242 may be a planar face that may be largely perpendicular to the second face 232, although angular variations between the second face 232 and the first transition face 242 may be contemplated. According to an embodiment, the first transition face 242 may be disposed at an angle that lies within a range of 85 degrees to 95 degrees with respect to the second face 232. Further, the second transition face 244 may be formed if the arcuate profile 238 of the inner edge surface 236, extending from the portion 210' of the second surface 210, defines a curvature that stops short of the second face 232 and the first transition face 242. In other words, the second transition face 244 may be a portion 210''' of the second surface 210 itself (associated with the bent portion 220) that does not encounter any machining and/or removal owing to the curvature defined by the arcuate profile 238 of the inner edge surface 236 stopping short of the second face 232 and the first transition face 242.

In an embodiment of the present disclosure, a portion 230' of the first face 230, the second face 232, the transition portion 240, and the inner edge surface 236 (having the arcuate profile 238), define the first root protrusion 114 of the first structural component 102, as shown in FIG. 1. The first root protrusion 114 extends radially outward from the portion 210' of the second surface 210 associated with the first end portion 216 of the first structural component 102 to an outer end 246 of the first root protrusion 114, thereby defining a root protrusion height $RP_H$ extending from the second surface 210 of the component 102 to the outer end 246 of the first root protrusion 114. As illustrated, in various embodiments, the outer end 246 of the first root protrusion 114 may correspond to the tint transition face 242. Further, according to the disclosed embodiment, it may he contemplated that the minor radius $R_{MN}$ may be defined so as to be aligned to and be equal to the height RPof the first root protrusion 114, although in certain other embodiments the radius $R_{MN}$ may be unequal to (e.g., higher than) the height $RP_H$—or example, when the arcuate profile 238 defines a curvature that extends at least in part or fully beyond the second face 232.

In an embodiment of the present disclosure, the first root protrusion 114 the arcuate profile 238, the inner edge surface 236, the root protrusion height $RP_H$, and the portion 230' of the first face 230 of the first outer weld surface 112, define the stress protected weld root region 126 (as shown in FIG. 1) isolated beyond and away from the root stress flow path 128 propagated through the body 204 of the first structural component 102.

Figure 8:
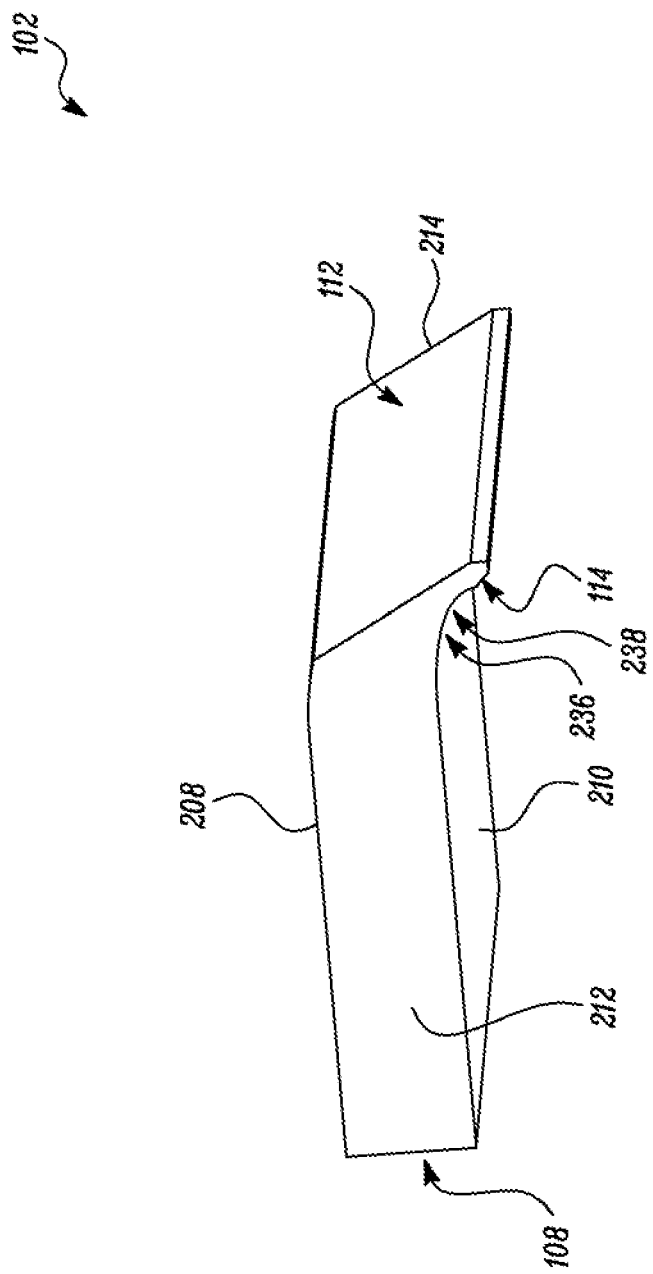
FIG. 8 illustrates a perspective view of the first structural component manufactured by the method illustrated in FIGS. 2 to 7, in accordance with the embodiment of the present disclosure.

Referring to FIG. 8, the resultant first structural component 102 having the first root protrusion 114 manufactured from the first structural component 102' by method 300, is illustrated. Similar to the first structural component 102, the second structural component 104 is also manufactured by the same method 300 and includes the respective second root protrusion 122 (see FIG. 1). The first structural component 102 and the second structural component 104 are joined by the groove weld 106 (which is a stress protected groove weld 106) to form the structure 100, as shown in FIG. 1. For example, the first outer weld surface 112 and the first root protrusion 114 of the first structural component 102 are aligned with the second outer weld surface 120 and the second root protrusion 122 of the second structural component 104, thus defining a V-shaped receiving portion therebetween into which a weld material may be received to form the groove weld 106, as illustrated in FIG. 1, and in turn joining the first structural component 102 with the second structural component 104.

INDUSTRIAL APPLICABILITY

The present disclosure may be applicable to any structure 100 composed of at least two structural components, i.e., the first structural component 102 and the second structural component 104 joined by at least one groove weld 106. The present disclosure may be applicable to any type of structural member, component, part, structure, and/or body which is capable of being joined to any other structural member, component, part, structure, and/or body via a groove weld, to form a weldment and resultant structure including the joined structural components.

Aspects of the disclosed method 300 of manufacturing the structural components 102, 104 to be joined by the stress protected groove weld 106 may reduce manufacturing costs and at the same time, significantly reduce or eliminate damage, fatigue, or failure within the groove weld 106 (including, in part, the adjacent and/or mating edges or surfaces of the structural components 102, 104 which are engaged and in thermal proximity with the groove weld 106, and the filler material thereof, which are mutually thermally bonded and transformed via the energy of the groove weld 106) which may be caused by cyclic loading, forces and/or stresses, which may include, in part, tensile or bending forces that produce stresses on the weld.

It will be apparent to those skilled in the art that various modifications and variations can be made to the system of the present disclosure without departing from the scope of the disclosure. Other embodiments will be apparent to those skilled in the art from consideration of the specification and practice of the system disclosed herein. It is intended that the specification and examples be considered as exemplary only, with a true scope of the disclosure being indicated by the following claims and their equivalent.

What is claimed is:

1. A method of manufacturing a first structural component for joining with at least one second structural component by a groove weld, the first structural component including a body having a first surface, a second surface, and an end portion, the method comprising:

bending the first structural component at the end portion to form a bent portion, the bent portion defining a convex face and a concave face;

removing a first portion of the bent portion at the convex face to form an outer weld surface, the outer weld surface including a first face extending from the first surface, and a second face connected to the first face; and removing a second portion of the bent portion at the concave face to form an inner edge surface having an arcuate profile, the inner edge surface extending from the second surface and connecting to the second face via a transition portion, wherein a portion of the first face, the second face, the transition portion, and the inner edge surface define a root protrusion for the first structural component, wherein the root protrusion extends radially outward from the second surface to an outer end to define a root protrusion height extending from the second surface of the first structural component. to the outer end; and wherein the root protrusion, the root protrusion height and the inner edge surface of the root protrusion define a stress protected weld root region isolated beyond and away from a root stress flow path propagated through the body of the first structural component.

2. The method of claim 1, wherein the first structural component includes a thickness within a range of 10 millimeters to 30 millimeters, and wherein the bent portion includes a bending radius of 2.5 times the predefined thickness.

3. The method of claim 1, wherein the first structural component includes a thickness within a range of 30 millimeters to 50 millimeters, and wherein the bent portion includes a bending radius of 3 times the predefined thickness.

4. The method of claim 1, wherein the first structural component includes a thickness greater than 50 millimeters, and wherein the bent portion includes a bending radius of 3.5 times the predefined thickness.

5. The method of claim 1, wherein the first structural component includes a first end portion and a second end portion and wherein the first structural component is bent at the second end portion with respect to the first end portion to form a bend angle, the bend angle being within a range of 110 degrees to 135 degrees.

6. The method of claim 1, wherein the arcuate profile of the inner edge surface is a circular profile.

7. The method of claim 1, wherein the arcuate profile of the inner edge surface is an elliptical profile having a major radius and a minor radius, the major radius being greater than the minor radius.

8. The method of claim 7, wherein the major radius is 2.5 times the minor radius.

9. The method of claim 1, wherein the second face of the outer weld surface defines an excluded angle between 190 degrees and 215 degrees with the first face.

10. A method of manufacturing a structure including the first structural component and the second structural component joined by the groove weld, the method comprising:

manufacturing each of the first structural component and the second structural component according to the method of claim 1;

aligning the outer weld surface and the root protrusion of the first structural component with the outer weld surface and the root protrusion of the second structural component to form a groove to receive a weld material therein; and welding the groove to join the first and second structural components to form the structure.

\* \* \* \* \*